United States Patent
Wang et al.

(10) Patent No.: US 11,480,935 B2
(45) Date of Patent: Oct. 25, 2022

(54) SYSTEM AND METHOD FOR AUTO-TAGGING BMS POINTS

(71) Applicant: Siemens Industry, Inc., Alpharetta, GA (US)

(72) Inventors: Qinpeng Wang, Chicago, IL (US); Gregory Conte, Gulf Breeze, FL (US)

(73) Assignee: Siemens Industry, Inc., Alpharetta, GA (US)

(*) Notice: Subject to any disclaimer, the term of this patent is extended or adjusted under 35 U.S.C. 154(b) by 175 days.

(21) Appl. No.: 17/084,869

(22) Filed: Oct. 30, 2020

(65) Prior Publication Data
US 2022/0137577 A1    May 5, 2022

(51) Int. Cl.
| | |
|---|---|
| G05B 19/042 | (2006.01) |
| G06N 3/08 | (2006.01) |
| H04L 41/0853 | (2022.01) |
| H04L 41/12 | (2022.01) |
| H04L 41/16 | (2022.01) |
| H04L 61/00 | (2022.01) |

(52) U.S. Cl.
CPC ........... *G05B 19/042* (2013.01); *G06N 3/08* (2013.01); *H04L 41/0853* (2013.01); *H04L 41/12* (2013.01); *H04L 41/16* (2013.01); *G05B 2219/25011* (2013.01); *H04L 61/00* (2013.01)

(58) Field of Classification Search
USPC .......................................................... 700/49
See application file for complete search history.

(56) References Cited

U.S. PATENT DOCUMENTS

| | | | |
|---|---|---|---|
| 9,400,493 B2 | 7/2016 | Brun et al. | |
| 9,519,276 B2 | 12/2016 | Brun et al. | |
| 2019/0235455 A1 | 8/2019 | Michals et al. | |
| 2019/0391573 A1 | 12/2019 | Wang | |
| 2021/0373510 A1* | 12/2021 | Borah | G05B 13/027 |

OTHER PUBLICATIONS

Koh et al., "Scrabble: Transferrable Semi-Automated Semantic Metadata Normalization using Intermediate Representation" Proceedings of the 5th Conference On Systems for Built Environments, vol. 18, Nov. 7, 2018, pp. 11-20 (Year: 2018).*

Leonardi et al., "Assisted Point Mapping to Enable Cost-effective Deployment of Intelligent Building Applications" 4th International High Performance Buildings Conference at Purdue, Jul. 11-14, 2016, 8 pgs. (Year: 2016).*

(Continued)

*Primary Examiner* — Emilio J Saavedra

(57) ABSTRACT

There is described a building management system and a method for auto-tagging points. Data associated with multiple points of a site are received, and each point is associated with a point name and a point descriptor. A building name is identified based on the point name for each point by extracting a first part detected frequently among the data associated with the points. A point equipment is determined from a second part of each point name and a point function is determined from a third part of each point name. A set of point tags is generated based on the point equipment, the point function, and the point descriptor. Confidence scores are created for the set of point tags based on matching characteristics to a common tag set.

19 Claims, 7 Drawing Sheets

(56) References Cited

OTHER PUBLICATIONS

Balaji et al., "Brick : Metadata schema for portable smart building applications" Applied Energy vol. 226 (2018) pp. 1273-1292. (Year: 2018).*

Leonardi Francesco et al: "Purdue e-Pubs Assisted Point Mapping to Enable Cost-effective Deployment of Intelligent Building Applications"; Proc. of 4th International High Performance Buildings Conference. Paper 193; Jul. 14, 2016 (Jul. 14, 2016); pp. 1-8; XP055862067; Retrieved from the Internet: URL:https://docs.lib.purdue.edu/cgi/viewcontent.cgi article=1192&context=ihpbc [retrieved on Nov. 16, 2021] p. 1; line 1—p. 4; last line.

Wang Weimin et al: "Automated point mapping for building control systems: Recent advances and future research needs"; Automation in Construction; vol. 85, Oct. 19, 2017 (Oct. 19, 2017); pp. 107-123; XP085281031; ISSN: 0926-5805; DO1: 10.1016/J.AUTCON.2017.09.013 p. 107; line 1—p. 121; right-hand column; line 47.

Balaji Bharathan et al: "Brick : Metadata schema for portable smart building applications", Applied Energy; Elsevier Science Publishers; GB; vol. 226, Feb. 23, 2018 (Feb. 23, 2018); pp. 1273-1292; XP085419864; ISSN: 0306-2619; DOI: 10.1016/J.APENERGY.2018.02.091 p. 1273; line 1—p. 1291; left-hand column; line 59; figures 4,10.

PCT Search Report dated Nov. 25, 2021, for PCT Application No. PCT/US2021/047464, 17 pages.

Jason Koh, "Scrabble: Transferrable Semi-Automated Semantic Metadata Normalization using Intermediate Representation", BuildSys '18. Nov. 7-8, 2018, Shenzen, China, 2018 Association for Computing Machinery, ACM ISBN 978-1-4503-5951-1/18/11, 10 pages.

\* cited by examiner

500

| Point Name | Descriptor | Unit | Type | Slope and Intercept | Virtual | Application Number |
|---|---|---|---|---|---|---|
| B1.AHU01.FL1.AVG.TMP | Fr 1 averg temp | F | LAI | NA | True | NA |

| List of Tags | Building Name | Equipment Name | Equipment Tag | Location |
|---|---|---|---|---|
| Zone air ave temp | B1 | AHU01 | ahu | FL1 |

SYSTEM AND METHOD FOR AUTO-TAGGING BMS POINTS

FIELD OF THE INVENTION

This application relates to the field of building management systems (BMSs) and, more particularly, to systems and methods employing machine-learning techniques for metadata tagging points of building management systems.

BACKGROUND

Building management systems encompass a wide variety of systems that aid in the monitoring and control of various aspects of building operation for building owners, facility managers, system integrators, and users. Building management systems include various environmental control subsystems, such as security, fire safety, lighting, and heating, ventilation, and air conditioning ("HVAC"). Systems may include on-site and remote building components and operate with third-party subsystems. Unfortunately, since subsystems have been developed separately by different manufacturers, each subsystem operates on its own proprietary protocol. Although standardization has been attempted for building management, there are still many different standards currently in-play, such as BACnet, Modbus, SNMP, and OPC. The situation has been further complicated by the addition of wireless of IoT technologies to building management.

A building management system may include a frontend framework that manages differing networks of backend devices on a common platform. The framework may utilize semantic data models and tagging features to manage specific and overall building management for backend devices. In particular, metadata tags of the framework associate backend devices with system features such as graphics, histories, alarms, schedules, and notes. The building system may improve its ability to detect abnormal conditions and diagnose them by utilizing the tagging framework.

Although the advantages of tagging of building points are well recognized, the task of tagging them is still quite challenging. Traditionally, the numerous points of a building management system are mapped manually by a technician or operator. That process is labor intensive and costly, presenting a major impediment to scaling building data analytics solutions. Another approach is to apply simple text search and/or regular expression to identify a match of a sub-string. This other approach can be cumbersome due to inconsistent point naming conventions. Some conventional systems have applied basic methods based on machine learning, which involve a breakdown of point names to n-grams and training a neural network as a multi-class classification problem. The drawbacks of these basic machine learning approaches include inconsistent point naming conventions and the necessity for massive training data (which are rarely available in practice). Also, some parts of a point name are irrelevant to machine learning-based mapping, such as the building name, so keeping them in the n-gram sequence makes little sense.

SUMMARY

In accordance with embodiments of the disclosure, there is provided an approach for auto-tagging points in a building management system. The approach extracts and determines metadata tags from data associated with points of a site using machine learning and, for some embodiments, expert systems. For this approach, analyses conducted by machine learning at an earlier stage allow another type of machine learning, utilized at later stage, to be trained with a small training dataset. The approach also leverages multiple information about a point, such as point type and point descriptor, to achieve significant mapping performance and generate substantial output including building name, equipment name, point location, and other tags. In addition to machine learning, expert systems may allow for the consolidation of abbreviations for different equipment and resolution of conflicts of point property and tags, thereby improving the quality of predicted tags. The expert systems may also allow for determination of tag information if the machine learning system(s) fails to provide acceptable results. The approach calculates confidence scores and assigns them to the predicted tags for each point.

One aspect is a building management system for auto-tagging points comprising a communication component, a processor, a conditional random field model, and a neural network. The communication component is configured to receive data associated with multiple points of a site, and each point is associated with a point name and a point descriptor. The processor is configured to identify a building name based on the point name for each point by extracting a first part of a particular point name detected frequently among the data associated with the points. In particular, the processor extracts a part of a point name detected frequently among all points from the same site or group. The conditional random field model is configured to determine a point equipment from a second part of each point name by predicting the point equipment with the conditional random field model. The conditional random field model is also configured to determine a point function from a third part of each point name by predicting the point function with the conditional random field model. For example, the conditional random field model may predict the semantic meaning of each part of a particular point, which may describe the equipment associate with the particular point, the location of the equipment at the site, and the function of the particular point for the system. The neural network is configured to generate a set of point tags based on the point equipment, the point function, and the point descriptor. The processor creates confidence scores for the set of point tags based on matching characteristics to a common tag set.

Another aspect is a method for auto-tagging points of a building management system. Data associated with multiple points of a site are received, and each point is associated with a point name and a point descriptor. A building name is identified based on the point name for each point by extracting a first part of a particular point name detected frequently among the data associated with the points. In particular, a part of a point name detected frequently among all points from the same site or group is extracted. A point equipment is determined from a second part of each point name by predicting the point equipment. A point function is determined from a third part of each point name by predicting the point function. For example, the semantic meaning of each part of a particular point is predicted, which may describe the equipment associate with the particular point, the location of the equipment at the site, and the function of the particular point for the system. A set of point tags is generated based on the point equipment, the point function, and the point descriptor. Confidence scores are created for the set of point tags based on matching characteristics to a common tag set.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

FIGS. 5A and 5B are representations depicting example data processed by the management system in FIG. 1 in accordance with the disclosed embodiments.

DETAILED DESCRIPTION

Figure 1:
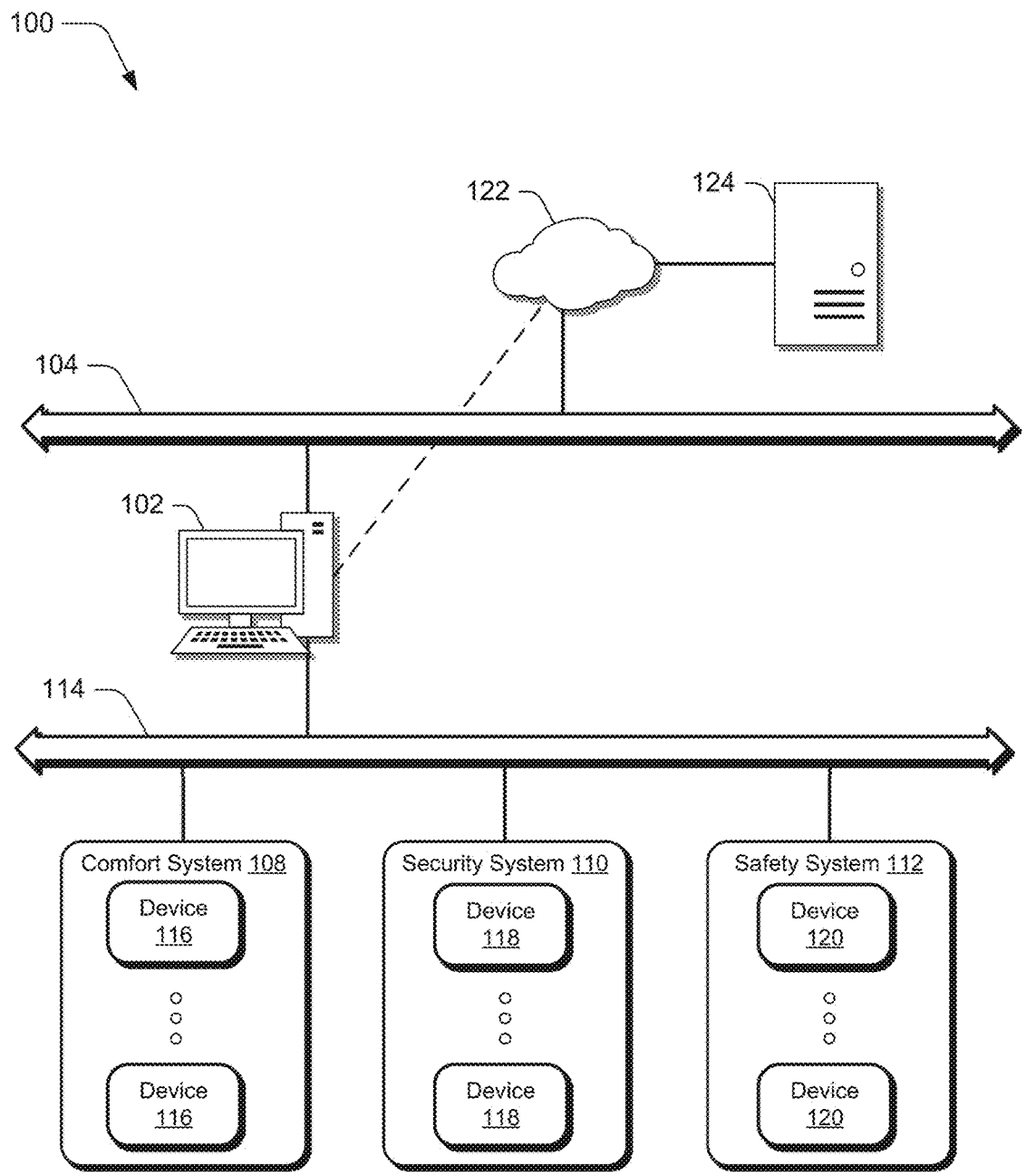
FIG. 1 is an illustration of a management system in accordance with disclosed embodiments.

Various technologies that pertain to systems and methods that facilitate auto-tagging of points of a site, such as a building or a group of buildings, will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Generally, machine learning approaches involve a two-step process. First, the system are trained using a statistical model with training data. Then, the system makes predictions with this model during the analysis period to look for a potential tags. Conventional system apply a single machine learning process to points of a site and, thus, have their drawbacks. For example, multiple parts of information, such as building name, equipment, and function, may be determined from a single point name and not all parts of the information may be analyzed by a single machine learning and/or expert system (or limited number of systems). As a result, the conventional system may generate unreliable results, thus leading to inaccurate tagging.

The building management system, particularly one or more processors of the system, is configured to identify building names by extracting a part of a point name detected frequently among all points from the same site or group. The conditional random field model is configured to predict the semantic meaning of each part of a particular point respectively, which might describe the equipment the particular point belongs to, the location of the equipment inside the building such as room or floor number, and the function the particular point plays in the BMS system (thereafter we will denotes this as the point function). The neural network is configured to generate a set of point tags based on the point equipment, the point function, and the point descriptor. The processor creates confidence scores for the set of point tags based on matching characteristics to a common tag set.

FIG. 1 illustrates a block diagram of management system 100 in which various embodiments of the present disclosure are implemented. In this illustrative embodiment, the management system 100 includes a data processing system 102 connected, via a management level network (MLN) 104 to various other data processing systems and other devices in the management system 100. MLN 104 may include any number of suitable connections, such as wired, wireless, or fiber optic links. MLN 104 may be implemented as a number of different types of networks, such as, for example, the Internet, a local area network (LAN), or a wide area network (WAN). In some embodiments, elements of the management system 100 may be implemented in a cloud computing environment 122, 124. For example, MLN 104 may include or be connected to one or more routers, gateways, switches, and/or data processing systems 124 that are remotely located in a cloud computing environment.

In this illustrative embodiment, data processing system 102 is operably connected to comfort system 108, security system 110, and safety system 112 via building level network (BLN) 114. The comfort system 108 is an environmental control system that controls at least one of multiple environmental parameters within a site or sites, such as, for example, temperature, humidity, and/or lighting. The security system 110 controls elements of security within a site or sites, such as, for example, location access, monitoring, and intrusion detection. The safety system 112 controls elements of safety within a site or sites, such as, for example, smoke, fire, and/or toxic gas detection.

The comfort system 108 may include comfort devices 116, the security system 110 may include security devices 118, and the safety system 112 may include safety devices 120. The devices 116-120 may be located inside or in proximity to one or more sites under the control of the management system 100. The devices 116-120 are configured to provide, monitor, and/or control functions of the comfort system 108, the security system 110, and/or the safety system 112 within one or more sites managed using the management system 100. For example, without limitation, the devices 116-120 may include one or more field panels, field controllers, and/or field devices inside or in proximity to one or more sites. More specifically, devices 116-120 may include one or more general-purpose data processing systems, programmable controllers, routers, switches, sensors, actuators, cameras, lights, digital thermostats, temperature sensors, fans, damper actuators, heaters, chillers, HVAC devices, detectors, motion sensors, glass-break sensors, security alarms, door/window sensors, smoke alarms, fire alarms, gas detectors, etc. The devices 116-120 may use the BLN 114 to exchange information with other components connected to the BLN 114, such as, for example, components within the comfort system 108, the security system 110, the safety system 112, and/or the data processing system 102. Field devices (such as sensors, actuators, cameras, light devices, heaters, chillers and other HVAC, security and fire safety devices may be connected via a field level network to a field panel or field controller for monitoring and controlling the respective field devices within a room, floor or other space of a site.

In these illustrative embodiments, objects associated with the management system 100 include anything that creates, processes, or stores information regarding data points, such as physical devices (controllers, field panels, sensors, actuators, cameras, etc.) and maintains data files, such as control schedules, trend reports, defined system hierarchies, and the like.

The data processing system 102 may include software extensions or services that provide operations of the management system 100. For example, the software extensions may include a print manager, a reporting subsystem, and a status propagation manager. A reporting subsystem implemented on a workstation data processing system 102 is a system that manages the acquisition of data values used in the generation of reports as well as comparative trend views.

The data processing system 102 is connected to the BLN 114 and includes one or more hardware and/or software interfaces for sending and receiving information to and from the devices 116-120 in the comfort system 108, the security system 110, and/or the safety system 112. For example, the data processing system 102 may request and receive data regarding a status of one or more devices in the devices 116-120. The data processing system 102 may also provides a user with the functionality to monitor real-time information about the status of one or more devices and objects associated with the management system 100. The data processing system 102 may further provides a user with the functionality to issue commands to control one or more devices and objects associated with the management system 100. For example, one or more of the devices 116-120 may operate on a network protocol for exchanging information with the management system, such as BACnet or LonTalk.

For some embodiments, the remote data processing system 124, located remotely in a cloud computing environment 122, 124, may provide supplemental services to one or more devices of the management 100, such as data processing system 102. For one embodiment, one or more remote data processing systems 124 may include a conditional random field model to determine a point equipment and a point function from each point name. The system(s) 124 may be configured to determine, or specifically predict, at least one of a point equipment, a point function, an equipment location, or other point characteristic, from parts of each point name. For another embodiment, one or more remote data processing systems 124 may include a neural network, based on multi-label classification model. The system(s) may be configured to generate a set of point tags based on the point equipment, the point function, and/or a point descriptor. For yet another embodiment, one or more remote data processing systems 124 may include at least one expert knowledge system to operate in case of a lack of performance by a machine learning system and/or infer point tags based on available data, such as a point unit, a point type, and a virtual-point indicator. For still other embodiments, one or more remote data processing systems 124 may perform a combination of the functions described.

The illustration of the management system 100 in FIG. 1 is not meant to imply physical or architectural limitations to the manner in which different illustrative embodiments may be implemented. Other components in addition to and/or in place of the ones illustrated may be used. Some components may be unnecessary in some illustrative embodiments. For example, any number of data processing systems may be used as workstations in the management system 100, while functions of the system manager application 122 may be implemented in different data processing systems in the management system 100, in addition to the system 102 and remote system 124. In other examples, the building management systems controlled by the management system 100 may not include one or more of the comfort system 108, the security system 110, and/or the safety system 112.

Figure 2:
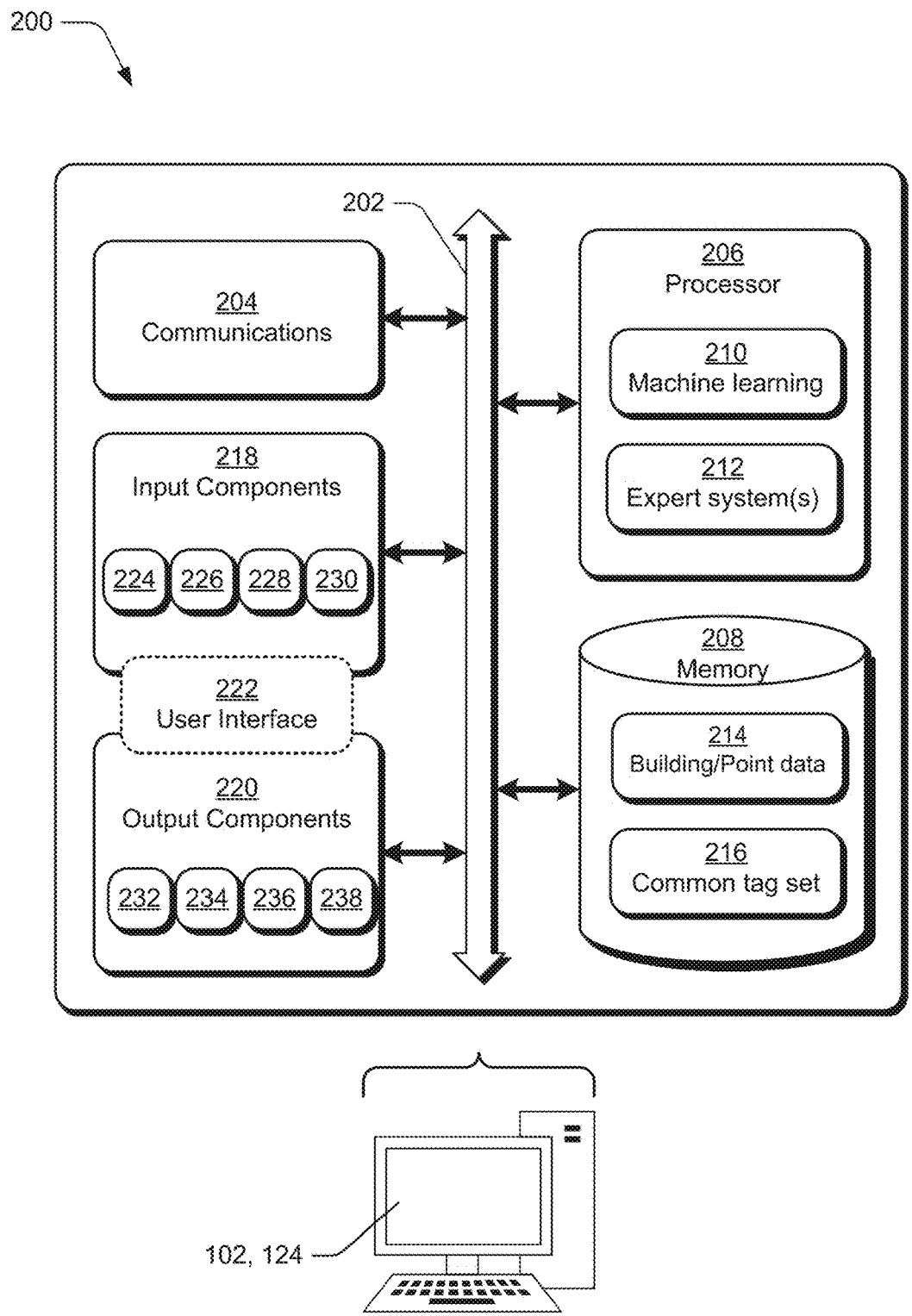
FIG. 2 illustrates a block diagram of a data processing system that may be employed in the management system in FIG. 1 in accordance with disclosed embodiments.

FIG. 2 represents example device components 200 of a processing system, such as data processing system 102 and/or remote data processing system 124 of the management system 100, for auto-tagging of points of a site. The device components 200 of the processing system comprise a communication bus 202 for interconnecting other device components directly or indirectly. The other device components include one or more communication components 204 communicating with other entities via a wired or wireless network, one or more processors 206, and one or more memory components 208.

The communication component 204 is configured to receive data associated with multiple points of a site from devices of the management system 100. For example, the communication component 204 may receive data from devices of the comfort, security, and safety systems 108-112 as well as the processing systems 102, 124. The communication component 204 may utilize wired technology for communication, such as transmission of data over a physical conduit, electrical or optical fiber indium. For some embodiments, the communication component 204 of the processing system 102, 124 may also utilize wireless technology for communication, such as radio frequency (RE), infrared, microwave, light wave, and acoustic communications RF communications include, but are not limited to, Bluetooth (including BLE), ultrawide band (UWB), Wi-Fi (including Wi-Fi Direct), Zigbee, cellular, satellite, mesh networks, PAN, WPAN, WAN, near-field communications, and other types of radio communications and their variants.

The processor or processors 206 may execute code and process data received other components of the device components 200, such as information received at the communication component 204 or stored at the memory component 208. The code associated with the management system 100 and stored by the memory component 208 may include, but is not limited to, operating systems, applications, modules, drivers, and the like. An operating system includes executable code that controls basic functions of the processing system, such as interactions among the various components of the device components 200, communication with external devices via the communication component 204, and storage and retrieval of code and data to and from the memory component 208.

Each application includes executable code to provide specific functionality for the processor 206 and/or remaining components of the processing system 102, 124. Examples of applications executable by the processor 206 include, but are not limited to, an operation module, a machine learning module 210 such as a conditional random field model and/or neural network, and an expert system module 212 such as expert knowledge system(s). Examples of machine learning systems include, but are not limited, a conditional random field model and a multi-label classification model. Either of these systems of the machine learning module 210 may be located at the processing system 102, the remote processing system 124, or both. The expert system module 212 may operate to determine information or tags in a case where a machine learning system fails to perform adequately and/or infer point tags based on available data, such as the point unit, the point type, and the virtual-point indicator. Similar to the machine learning module 210, either of these expert knowledge systems of the expert system module 212 may be located at the processing system 102, the remote processing system 124, or both.

Data stored at the memory component 208 is information that may be referenced and/or manipulated by an operating system or application for performing functions of the processing system 102, 124. Examples of data associated with the management system 100 and stored by the memory component 208 may include, but are not limited to, building and point data 214 and a common tag set 216. The building and point data include, but are not limited to, data associated points, point names, building names, point equipment, point functions, natural language versions of point functions, equipment locations, a library of abbreviations, point tags, point descriptors, point units, point types, virtual-point indicators, and confidence scores for point tags. The common tag set is utilized by the processing system 102, 124 as a baseline to develop confidence scores for the point tags.

The device components 200 of the processing system 102, 124 may include one or more input components 218 and one or more output components 220. The input components 218 and output components 220 of the device components 200 may include one or more visual, audio, mechanical, and/or other components. For some embodiments, the input and output components 218, 220 of the processing system 102, 124 may include a user interface 222 for interaction with a user of the device. The user interface 222 may include a combination of hardware and software to provide a user with a desired user experience. Examples of input components 218 include, but are not limited to, a keyboard 224, a motion detector 226 (such as a mouse or touchpad), a video input 228 (such as an imager), an audio input 230 (such as a microphone), and the like. Examples of output components 220 include, but are not limited to, a display 232, a visual indicator/projector 234, an audio output 236 (such as a speaker), a mechanical actuator 238, and the like.

It is to be understood that FIG. 2 is provided for illustrative purposes only to represent examples of the device components 200 of a processing system 102, 124 and is not intended to be a complete diagram of the various components that may be utilized by the system. Therefore, processing system 102, 124 may include various other components not shown in FIG. 2, may include a combination of two or more components, or a division of a particular component into two or more separate components, and still be within the scope of the present invention.

Figure 3:
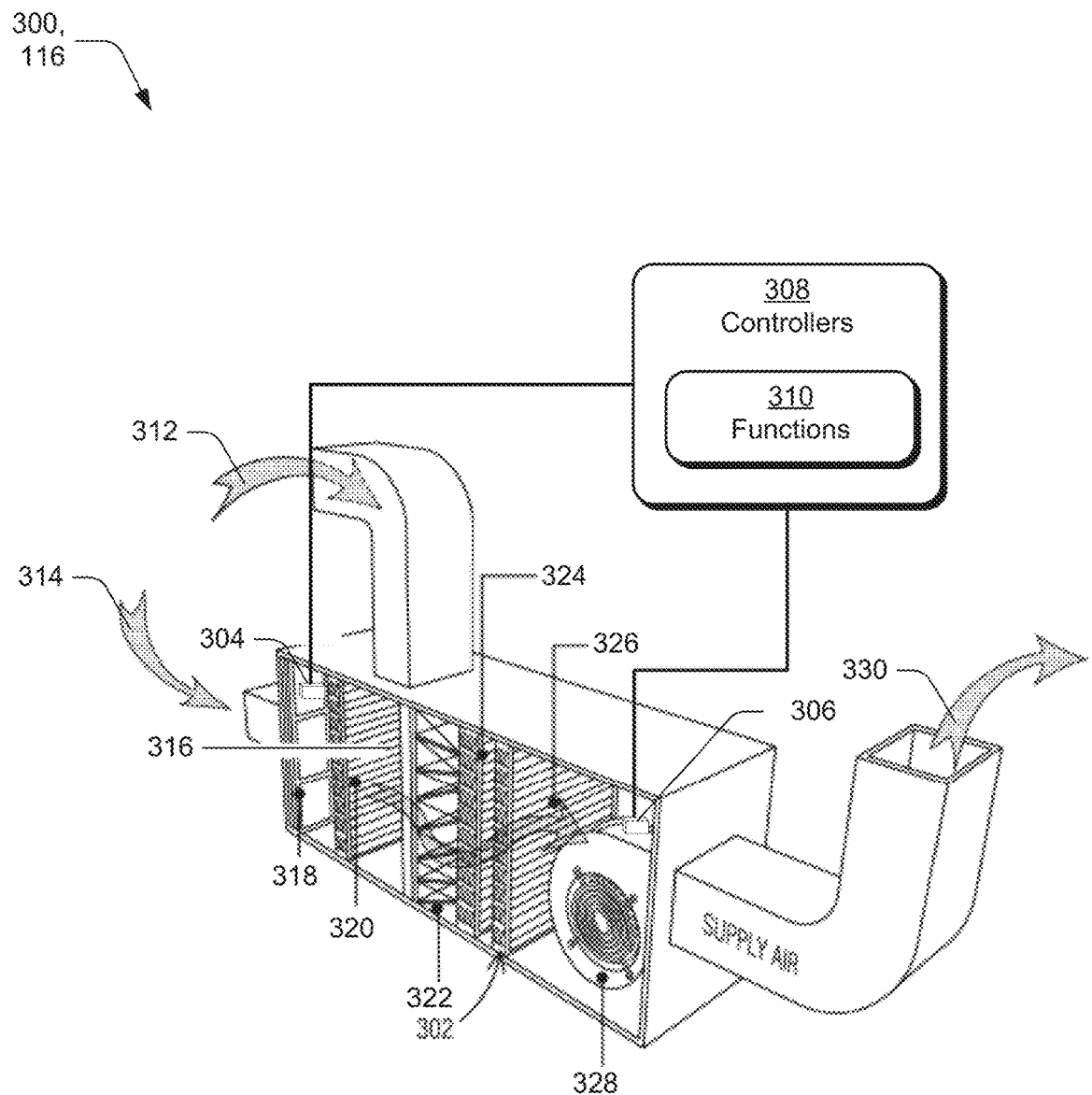
FIG. 3 illustrates an example of a comfort device in accordance with disclosed embodiments.

FIG. 3 illustrates an example of a comfort device 300,116 in accordance with disclosed embodiments, in this example an air handling unit 302. Each comfort device 116, or other devices described above in the management system 100, may have one or more sensors 304, actuators 306, or controllers 308. Each controller 308 can have one or more associated functions 310 that control, monitor, or otherwise interact with the sensors 304 and actuators 306. Sensors 304 can include any sensors used in the corresponding device, such as thermometers, pressure sensors, airflow sensors, safety sensors such as fire or smoke detectors, motion sensors, heat sensors, or otherwise. Actuators 306 can include any controllable device, such as fans, solenoids, switches, motors, etc. The controller 308 can communicate with data processing system 102, and in some embodiments, data processing system 102 directly acts as the control 308. This particular, non-limiting example of an air handling unit 302 illustrates elements such as the return air 312, outdoor air 314, mixing section 316, filter 318, preheat coil 320, bag filter 322, cooling coil 324, reheat coil 326, fan 328, and supply air 330.

In particular, data can be stored for each of the sensors 304, actuators 306, controllers 308, or functions 310 that indicate the state, operation, or readings of each of these components, and this data can be stored in a database, such as building and point data 214, or another storage. This data can include multiple data points for each of these elements. This data is used by functions 310, controller 308, and data processing system 102 to operate and monitor the management system 100, including performing auto-tagging processes as disclosed herein. Of course, these particular sensors, actuators, controllers, and functions are for purposes of illustration, but each of the particular process implementations can use data from its own sensors, actuators, controllers, or functions, as described below.

Figure 4A:
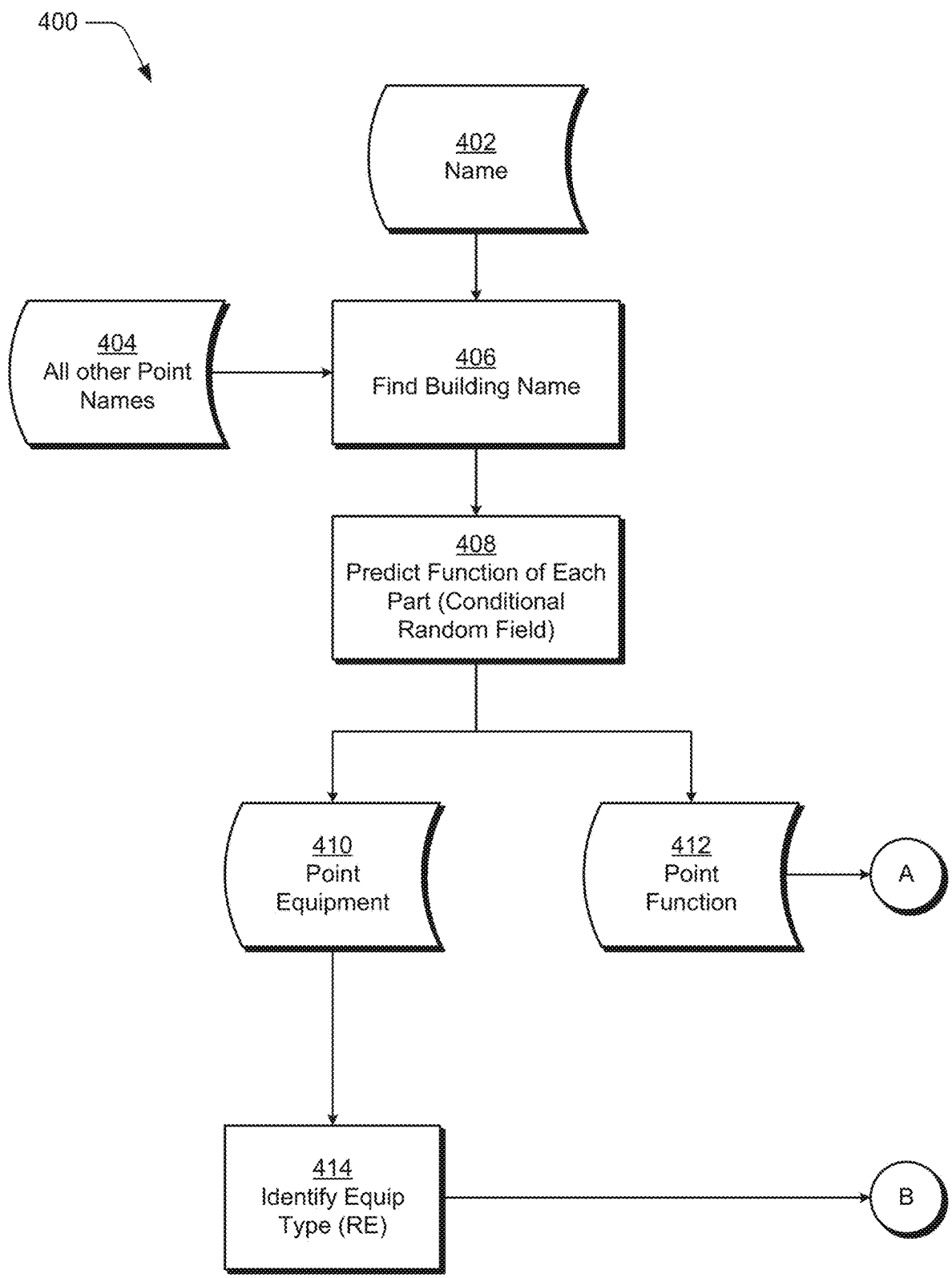
FIGS. 4A-4C are sections of a flow diagram depicting a process performed in the management system in accordance with disclosed embodiments.
Figure 4B:
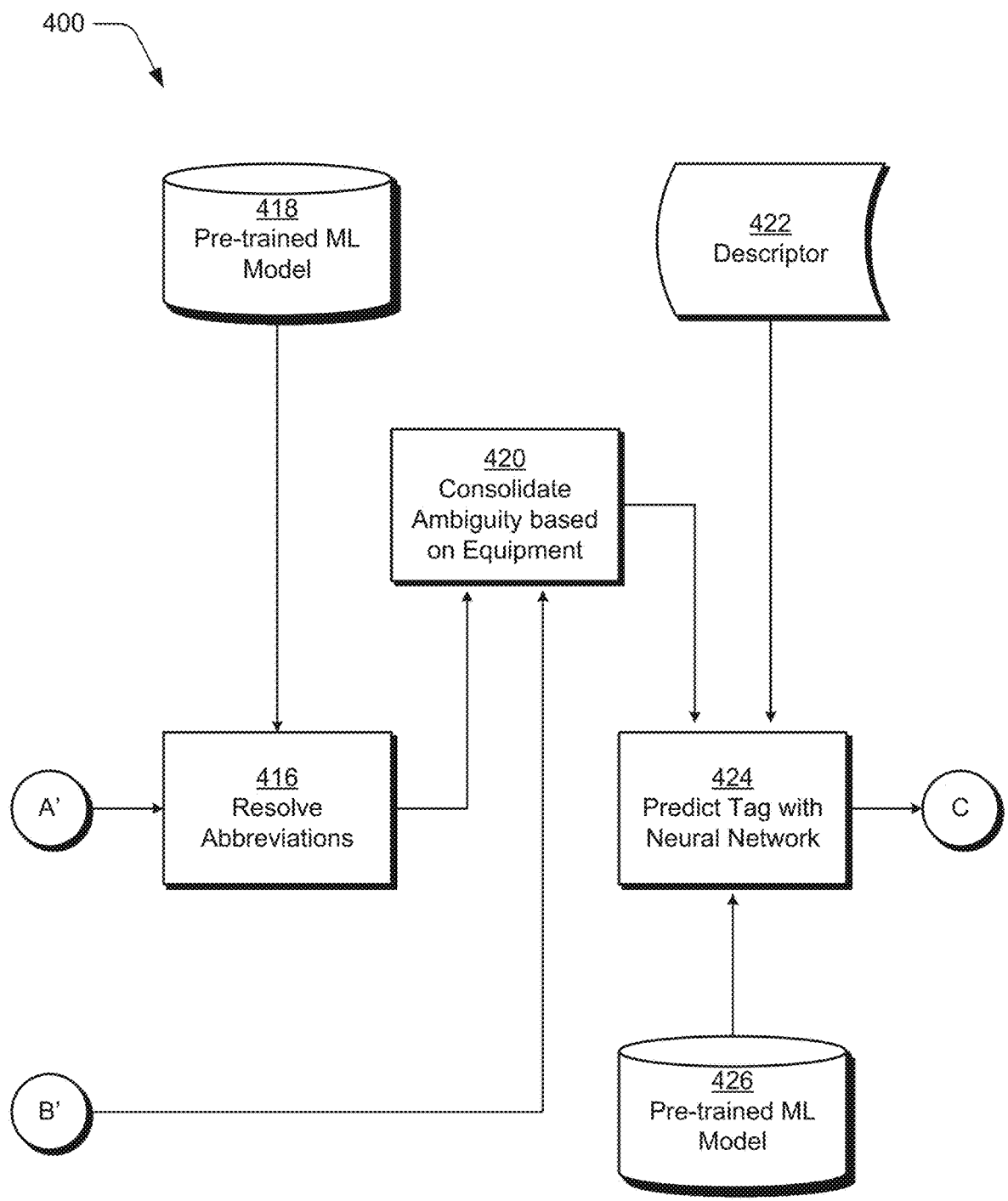
Figure 4C:
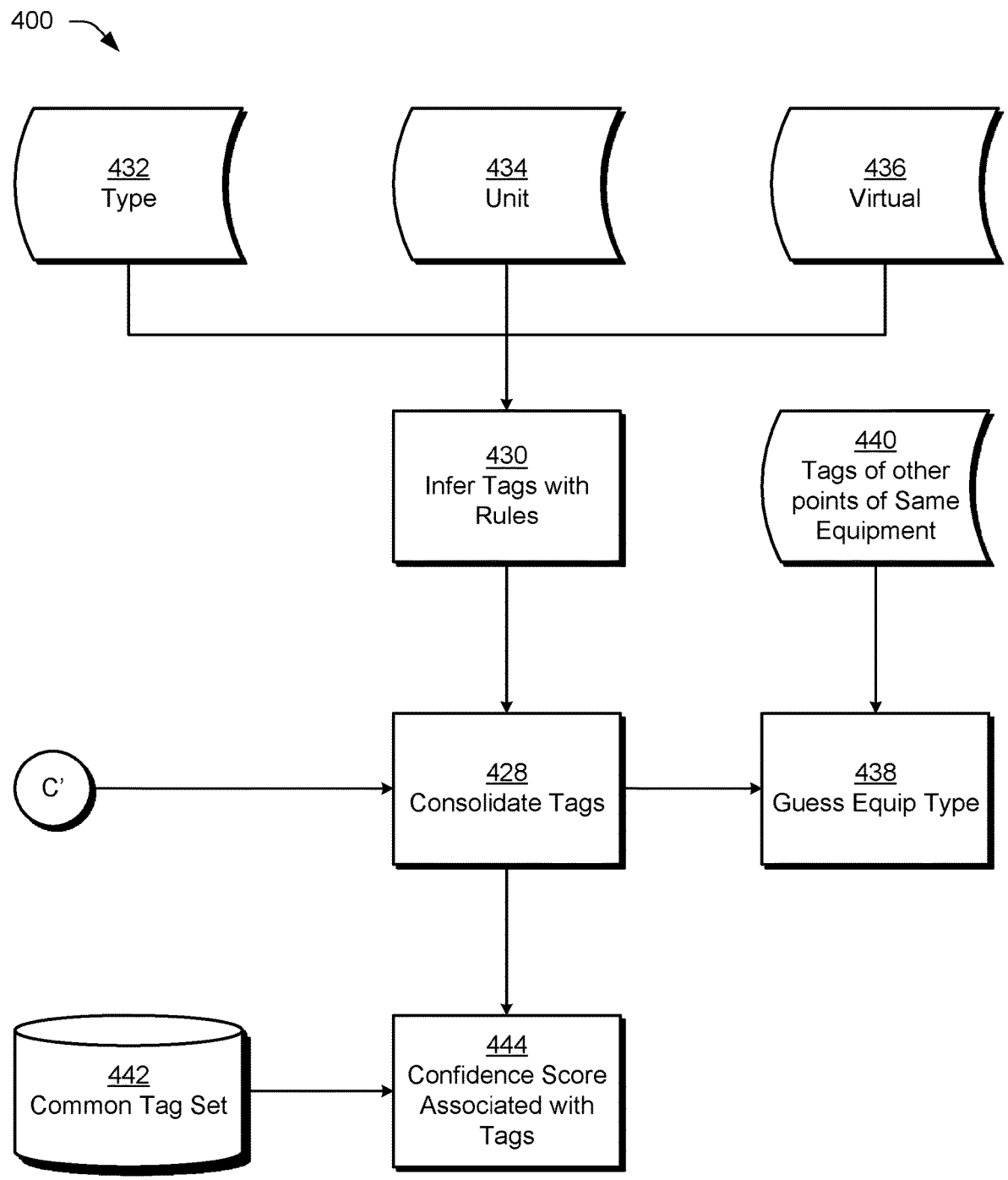

FIGS. 4A-4C depict a flowchart of an exemplary set of operations 400 that may be executed by a management system 100 to perform auto-tagging using deep learning techniques as described herein. The process may be implemented by executable instructions stored in a non-transitory computer-readable medium that cause one or more data processing systems 102, 124 to perform such a process. For ease of reference, these are generically referred to as the "processing system" below, and the processing system may, for example, run modules to perform the processes described below.

Referring to FIG. 4A, the operations 400 of the management system 100 are initiated by receiving data associated with a plurality of points 402, 404 of a site for a building management system to be analyzed. The data includes point names 402, 404, point descriptors, and other information associated points of the building management system. For example, each point is associated with a point name 402 and a point descriptor. The management system 100 then identifies a building name based on the point name 402 for each point (406). For some embodiments, the management system 100 identifies the building name by extracting a first part of a particular point name detected frequently among the data associated with the points. The management system 100 may review all, or substantially all, points 402, 404 within the data associated with the site. For these embodiments, the part of point name that shows up most frequently across all point names 402, 404 may be identified as the building name.

Next, the operations 400 of the management system 100 may predict other functions or properties of the building and/or point from each part of a remaining point name (408). For example, the building name may be removed from the point name to create a reduced point name. The other properties that may be determined from the reduced point name include, but are not limited to, point equipment 410 (such as equipment name), a point function 412, and an equipment location. For some embodiments, a machine learning system may determine one or more properties from different parts of each point name with a pre-trained conditional random field ("CRF") model, which is used commonly in natural language processing domain for Named Entity Recognition (NER). The CRF model may be trained by adjusting model weights based on goodness-of-fit to quality training data and tuning hyperparameters manually or semi-automatically, and measures are taken to prevent over-fitting, such as regulation techniques and cross-validation. For example, for the CRF model, if there is text identifying a location in the dataset, the NER would categorize the text as a location. As another example, the dataset may include text with a type of location, and the CRF may categorize the text as a type of location. For some embodiments, the CRF is trained to data specific to building management domain.

For example, the CRF may analyze a point named "AHU01.FL1.AVG.TMP" and predict equipment, equipment ID, equipment location, equipment location ID, and one or more point functions. Point names have delimiters as well as one or more numbers with them. The CRF may predict a semantic meaning of each part and extract a part associated with a point equipment, a part associated with a point function of this point, and the like. For example, the CRF may predict "AHU01" to be a part to denote an equipment name, regardless of whether this delimiter and/or number is located at the beginning of the point name. For some embodiments, the management system 100 may predetermine one or more parts of the point name. For example, the management system 100 and/or its associated CRF may seek the building name before first delimiter.

As stated above, in reference to FIG. 4A, the operations 400 of the management system 100 may determine a point equipment 410 from a second part of each point name by predicting the point equipment (408), in response to identifying the building name (406). Likewise, in response to identifying the building name (406), the operations 400 of the management system 100 may determining a point function 412 from a third part of each point name by predicting the point function (408). Further, the operations 400 of the management system 100 may determining an equipment location from a fourth part of each point name by predicting the point function (408) in response to identifying the building name (406). For some embodiments, a machine learning system may determine the point equipment and/or the point function of each point name with a conditional random field ("CRF") model. The parts of the point name are used together with a descriptor (included with the received data) in subsequent steps, to map this point to a set of tags.

The point equipment 410 and equipment ID parts of the point name may be used to generate equipment name and/or equipment tag for the point (414). Regular expressions ("REs") are used to identify equipment tag from the equipment name. If REs fail to identify the equipment tag, then an expert knowledge system may process the available information, based on a group of points sharing a similar equipment name. For instance, if an equipment with unfamiliar name has supply, return, exhaust air temperature sensors, and heating and cooling coil valve commands, then the management system 100 may determine that this equipment is an air handler. Accordingly, the expert knowledge system determines the equipment tag based on the group of points sharing the similar equipment name in response to the processor failing to identify the equipment tag by regular expressions.

Referring to FIG. 4B, the point function 412 of the point name resolves to natural language after referring to a dedicated library of abbreviations for a building HVAC domain (416). Thus, the management system 100 generates a natural language version of the point function based on a library of abbreviations for a building management domain. For some embodiments, the natural language of the point function is substantially similar to a descriptor, such as the point descriptor received by the management system 100. For instance, abbreviation-based "AVG.TMP" may resolve to natural language-based "average temperature". Using the library of abbreviations, many different point names created by various operators or technicians may resolve to the same phrase to natural language, thereby reducing the size of any needed training dataset for the neural network(s) 418. The expert knowledge system has a consolidation feature to resolve ambiguity among different equipment, due to natural language (420). For instance, the abbreviation "cds" may translate to "cooldown setpoint" for an air handler or translate to "condenser water supply" for a water system. The management system 100 may resolve ambiguity among possible point functions based on the point equipment by utilize the expert knowledge system to resolve these types of ambiguity.

Next, the operations 400 of the management system 100 combines point names and descriptors to form a bag of words. In particular, in response to identifying and processing the determined point equipment 410 and the determined point function 412, the management system 100 may generate a set of point tags based on the point equipment, the point function, and the received point descriptor 422 (424). For some embodiments, the management system 100 may generate the set of point tags by predicting the set of point tags with a pre-trained neural network, such as a multi-label classification model. In view of the operations performed previously by the conditional random field model, the neural network 426 is not faced with irrelevant information such as building name, equipment name and ID, location and ID, thus reducing the needed size of the training dataset for the neural network. In addition, the management system 100 leverages the point descriptor 422 in tagging will help improve tagging performance.

Further, for embodiments utilizing multi-label classification, the neural network 426 outputs a set of tags in contrast to a single category observed in conventional systems. As a result, training data points that share the same tag are capable of assisting each other. If there is a new class/category not seen in a training set, the neural network 426 is able to predict the tags. Each tag is understood well individually by the neural network 426 from other training data points, so the tags are understood as a group as well. For example, in contrast to conventional systems, the management system 100 is able to process a category new to the training set such as "exhaust water temperature" and generate tags "exhaust", "water", "temp". This is due to the fact that each of these tags is understood by the neural network 426 from other training data points, so the entire group "exhaust water temperature" is also understood. Accordingly, the size of training dataset may be minimized.

Referring to FIG. 4C, the operations 400 of the management system 100 consolidates the set of tags (428) predicted by machine learning with inferred tags based on rules (430). Each point is associated with a point unit 432, a point type 434, and/or a virtual-point indicator 436, and the associated information may be received by the management system 100 with the point name. For some embodiments, the management system 100 may infer point tags with an expert knowledge system based on the point unit 432, the point type 434, and the virtual-point indicator 436 (430). The expert knowledge system may also infer tags based on other information including, but not limited to, sensor data such as slope and intercept, application number, and the like. In addition, the management system 100 may associated different weights for consolidated tags. For example, the tags predicted by machine learning may be assigned less weight than the inferred tags based on rules.

In response to consolidating the tags (428), the operation 400 of the management system 100 may guess any remaining equipment types (438) based on tags of other points of the same, or similar, equipment (440). Specifically, where an equipment type of a particular equipment is not identified from regular expressions, related points from this equipment may be grouped and, by understanding tags of this group of points, the management system 100 may determine the equipment type.

For some embodiments, the operation 400 of the management system 100 may create confidence scores for the set of point tags based on matching characteristics to a common tag set 442 (444). For some embodiments, the management system 100 may create the confidence scores for the set of point tags predicted by machine learning as well as the point tags inferred by the expert knowledge system, based on matching characteristics to the common tag set 442 (444). For these embodiments, the tag of each point is compared to a pre-defined list of tag groups/tag sets 442, and a confidence score is calculated based on how closely they match.

Referring to FIGS. 5A and 5B, there is shown representations depicting example data processed by the management system 100. FIG. 5A illustrates an example input 500 that may be received by the management system 100 in which multiple inputs may be included in a file having all relevant building management system points associated with a site. For input 500 of each point, example properties include, but are not limited to, a point name 502, a point descriptor 504, a point unit 506, a point type 508, a sensor slope and intercept 510, a virtual-point indicator 512, and/or an application number (514). The virtual-point indicator 512 may be a Boolean value to distinguish between a virtual point and a physical point. FIG. 5B illustrates example outputs 520 of the management system 100 as inputs 500 are processed. Examples of possible outputs for each point include, but are not limited to, a list of tags 522, a building name 524, an equipment name 526, an equipment tag 528, and/or an equipment location 530.

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least parts of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. A building management system for auto-tagging points comprising:
    a communication component configured to receive data associated with a plurality of points of a site, each point of the plurality of points is associated with a point name and a point descriptor;
    a processor configured to identify a building name based on the point name for each point by extracting a first part of a particular point name detected frequently among the data associated with the plurality of points;
    a conditional random field model configured to determine a point equipment from a second part of each point name by predicting the point equipment with the conditional random field model and determine a point function from a third part of each point name by predicting the point function with the conditional random field model; and
    a neural network configured to generate a set of point tags based on the point equipment, the point function, and the point descriptor,
    wherein the processor creates confidence scores for the set of point tags based on matching characteristics to a common tag set.

2. The building management system as described in claim 1, further comprising an expert knowledge system that determines an equipment tag based on a group of points sharing a same or similar equipment name in response to the processor failing to identify the equipment tag by regular expressions.

3. The building management system as described in claim 1, wherein the conditional random field model is trained with data specific to a building management domain.

4. The building management system as described in claim 1, wherein the conditional random field model determines an equipment location from a fourth part of each point name by predicting the point equipment with the conditional random field model.

5. The building management system as described in claim 1, wherein the processor generates a natural language version of the point function based on a library of abbreviations for a building management domain.

6. The building management system as described in claim 1, the processor resolves ambiguity among a plurality of possible point functions based on the point equipment.

7. The building management system as described in claim 1, wherein the neural network generates the set of point tags with a multi-label classification model trained with data specific to a building management domain.

8. The building management system as described in claim 1, further comprising an expert knowledge system, wherein:
    the data is associated with a point unit, a point type, and a virtual-point indicator; and
    the expert knowledge system infers point tags based on the point unit, the point type, and the virtual-point indicator.

9. The building management system as described in claim 8, wherein the processor creates confidence scores for the point tags inferred by the expert knowledge system based on matching characteristics to the common tag set.

10. A method for auto-tagging points of a building management system, the method comprising:

receiving data associated with a plurality of points of a site, each point of the plurality of points being associated with a point name and a point descriptor;

identifying a building name based on the point name for each point by extracting a first part of a particular point name detected frequently among the data associated with the plurality of points;

determining a point equipment from a second part of each point name by predicting the point equipment;

determining a point function from a third part of each point name by predicting the point function;

generating a set of point tags based on the point equipment, the point function, and the point descriptor; and creating confidence scores for the set of point tags based on matching characteristics to a common tag set.

11. The method as described in claim 10, further comprising determining an equipment tag based on a group of points sharing a same or similar equipment name in response to failing to identify the equipment tag by regular expressions.

12. The method as described in claim 10, wherein determining the point equipment from the second part of each point name includes predicting the point equipment with a conditional random field model trained with data specific to a building management domain.

13. The method as described in claim 10, wherein determining the point function from the third part of each point name includes predicting the point function with a conditional random field model trained with data specific to the building management domain.

14. The method as described in claim 10, further comprising determining an equipment location from a fourth part of each point name by predicting the point equipment with a conditional random field model trained with data specific to a building management domain.

15. The method as described in claim 10, further comprising generating a natural language version of the point function based on a library of abbreviations for a building management domain.

16. The method as described in claim 10, further comprising resolving ambiguity among a plurality of possible point functions based on the point equipment.

17. The method as described in claim 10, wherein:
generating the set of point tags includes predicting the set of point tags with a neural network, and
the neural network is a multi-label classification model trained with data specific to a building management domain.

18. The method as described in claim 10, wherein each point of the plurality of points is associated with a point unit, a point type, and a virtual-point indicator, the method further comprising:
inferring point tags with an expert knowledge system based on the point unit, the point type, and the virtual-point indicator.

19. The method as described in claim 18, wherein creating the confidence scores includes creating the confidence scores for the point tags inferred by the expert knowledge system based on matching characteristics to the common tag set.

* * * * *